Feb. 20, 1945.   J. L. BERGER   2,369,643
PRESS PAD
Filed July 11, 1942
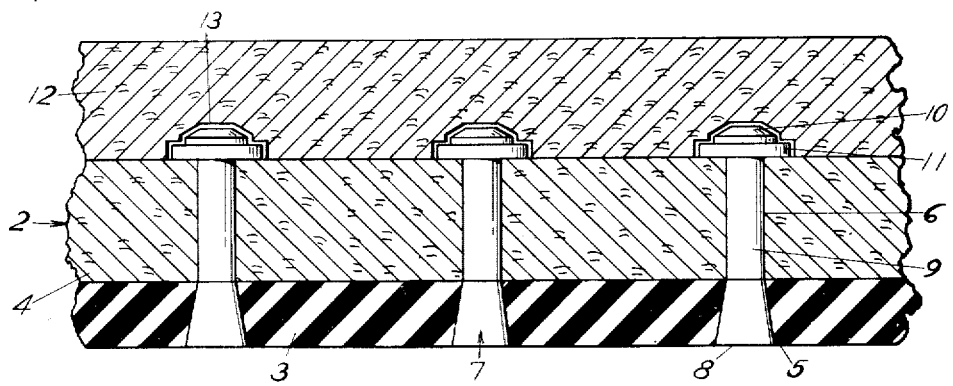
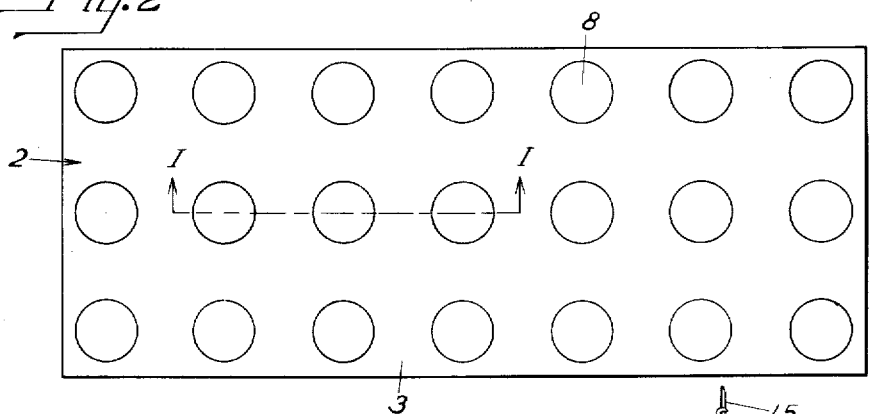
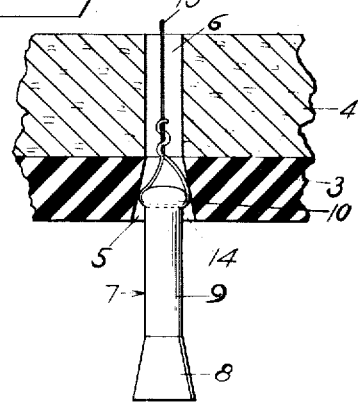
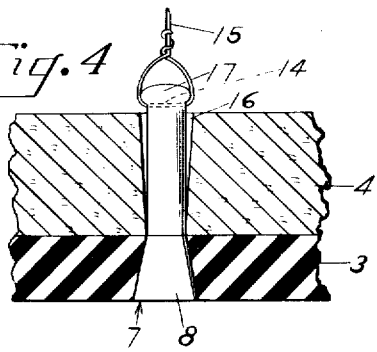
Inventor
John L. Berger
by
Walter F. Kaufman
Attorney Patented Feb. 20, 1945

2,369,643

UNITED STATES PATENT OFFICE 2,369,643

PRESS PAD

John L. Berger, Columbia, Pa., assignor to Armstrong Cork Company, Lancaster, Pa., a corporation of Pennsylvania Application July 11, 1942, Serial No. 450,606

6 Claims. (Cl. 113—44)

This invention relates to press pads for sheet metal forming, shaping, and shearing. More particularly, the invention relates to a laminated press pad in which the facing layer which engages the sheet to be formed or sheared is mechanically joined to the backing layer by means of fastening elements which have substantially the same flow characteristics as the facing layer so that in use uniform shaping and accurate shearing may be effected by the press pad.

In my copending applications, Serial No. 416,799, filed October 28, 1941, entitled "Method and apparatus for shaping and shearing sheet materials," and Serial No. 423,754, filed December 20, 1941, entitled "Sheet metal shaping and shearing," I have disclosed methods of shaping and shearing sheet metal involving the use of a laminated press pad including a resilient facing layer, such as rubber, and a compressible backing layer, such as cork composition. In use, I have found that it is desirable that the facing layer be joined to the cork composition backing layer. In order to permit the rubber facing layer to flow freely as required in the methods disclosed in my applications, it is essential that the facing layer be yieldingly secured to the cork composition backing layer and preferably free to flow laterally to some limited extent at least with respect to the backing layer. Adhesives have been found generally unsatisfactory for this purpose because it is difficult to secure a satisfactory bond and if a good bond is obtained, the adhesive prevents free flow of the rubber under compressive forces in use and either the adhesive or the cork composition backing layer frequently ruptures and separation of the layers results.

The chief object of this invention is to provide a press pad in which the resilient facing layer is so mechanically joined to the backing layer that the flow characteristics of the facing layer are not materially altered in use by the presence of the fastening means. Another object of my invention is to provide a laminated press pad in which the resilient facing layer is free for limited lateral flow or movement with respect to the backing layer when under pressure. A further object is to provide a simple method of assembling the elements of my press pad without the use of other than hand tools.

The invention provides a press pad formed of a facing layer of resilient material capable of flowing under pressure, such as rubber, a backing layer, preferably capable of compression without material flow under pressure, such as cork composition, and resilient fastening elements capable of flowing under pressure mechanically joining the layers together. The fastening elements may be in the form of rivets which pass through both layers and they are preferably formed of a composition having flow characteristics closely approaching those of the facing layer. Maximum efficiency is obtained if the facing layer and at least a portion of the fastening elements disposed within the facing layer are of the same composition, for then the flow characteristics will be substantially identical.

The invention also provides a method of assembling the press pad by stretching the fastening element to reduce its cross sectional area, disposing it through the facing and into the backing layer and permitting it to return to its original cross sectional shape to mechanically join the layers together.

The attached drawing illustrates my invention in which

Figure 1 is an enlarged sectional view of a portion of the pad taken on the line I—I of Figure 2;

Figure 2 is a bottom plan view of the press pad of my invention;

Figure 3 is a diagrammatic view illustrating one method of assembling the fastening elements with the facing and backing layers; and Figure 4 is a similar diagrammatic view illustrating a modified method of assembly.

Referring to the drawing, there is illustrated a press pad designated generally at 2. In the embodiment illustrated, press pad 2 includes a facing layer 3 formed of rubber, synthetic rubber composition, or other similar materials which possess resilient and flexible characteristics and are thus capable of flowing under pressure. Preferably, the facing layer 3 possesses a Durometer hardness falling within the range of 65 to 70, although this may vary with the sheet being formed and the particular shaping and shearing operations involved. A backing layer 4 is provided disposed in contiguous planar relationship with facing 2. The backing layer 4 is preferably formed of a compressible material such as cork composition, that is, cork granules held together by a suitable binder such as a phenol aldehyde resin, a glue-glycerine binder, or similar material having the desired physical characteristic. While the invention is particularly directed to laminated press pads in which the backing layer is formed of cork composition or other truly compressible material, as contrasted with materials such as rubber which flow rather than compress under pressure, the backing layer 4 may be of resilient or flowable material. The facing layer 3 is preferably of an area sufficiently large to cover the backing layer 4 but if desired it may be of less area so long as it is large enough to cover the die over which the sheet material is formed. Enlarged openings 5 are provided in the facing 3; in the illustrated embodiment they are tapered. Openings 6 are formed in the backing layer 4 in alignment with the openings 5 in the facing layer 3. Resilient members in the form of rivets 7 are disposed in the openings 5 and 6 and securely hold the layers as an integral unit.

Each rivet 7 includes a tapered head portion 8 and a shank 9 extending therefrom terminating in an enlarged end 10. A resilient washer 11 of rubber, synthetic rubber, or the like is disposed in position surrounding the shank 9, between the enlarged end 10 and the rear surface of the backing layer 4. A coating of rubber cement or other adhesive may be applied to the head 8 of each rivet 7, but this is not necessary although it has been found to aid in assembly.

It is essential in my invention that the rivet 7 be resilient and flexible and thereby capable of flowing under pressure and should possess approximately the same Durometer hardness as the facing 3 so that when the press paid is subjected to compressing forces at least the head of the rivet will flow to substantially the same degree as the facing 3. No adhesive is necessary between the layers 3 and 4 and, in fact, better results are obtained if none is used for then the facing 3 is free for limited lateral movement with respect to backing 4 upon the application of pressure. The rivets 7 are sufficiently flexible to permit such limited movement.

If desired, a second compressible layer 12 of cork composition may be disposed rearwardly of the layer 4 and may be provided with recesses 13 adapted to receive the enlarged ends 10 and washers 11. The layer 13 may be adhesively secured to the layer 4, if desired.

The layers 3 and 4 may be joined using rivets 7 by various methods. I prefer, however, to place the layers 3 and 4 in contiguous planar relationship with the openings 5 and 6 in axial alignment. This is illustrated in Figure 3. Each of the rivets has a hole 14 drilled through its enlarged end 10 and a wire 15 is looped through this opening. The rivets may be lubricated with water if found necessary and when tension is applied to the wire 15 the head 10 is stretched and the cross sectional shape thereof so changed, as diagrammatically illustrated in Figure 3, that it will pass through the openings 5 and 6. When the tension is released, the enlarged head portion 10 will naturally return to its original condition and will thus overlie the opening 6. The rivet may be so formed that the head 10 when in its normal condition will lie in engagement with the rear surface of the backing 4 or, as illustrated in Figure 1, a resilient washer 11 may be positioned under the head and in engagement with the rear surface of the backing 4. If a washer is used, it is applied after the rivet 7 has been pulled through the aligned openings 5 and 6. The washer will be dropped over the wire 15; the head 10 will be deformed by the application of tension to the wire; the washer will be stretched by means of pliers and brought down into engagement with the rear surface of the backing 4, and the tension will then be released, the head returning to its normal condition and engaging the washer 11 pressing it into engagement with the rear surface of the backing 4.

The rivet may be under slight tension if desired when in final position, provided the tension is not so great as to materially alter the flow characteristics of the rivet 7 relative to the flow characteristics of the facing 3. It is desirable to have at least sufficient tension applied to the rivet 7 to support the weight of the facing 3, thus holding the layers 3 and 4 in continuous contact.

In a modified form of my invention illustrated in Figure 4, the backing layer 4 is provided with a tapered opening 16 and the rivet 7 has an enlarged head 8 similar to the head 8 of the embodiment shown in Figures 1 to 3, inclusive, and a similar enlarged end portion 17 adapted when in normal condition to fill the opening 16 in the backing layer 4. In the assembly of this modified form of fastening means a procedure similar to that illustrated in Figure 3 is followed but here there is no enlarged head portion extending over the rear surface of the backing 4. Instead, the rivet is elongated by stretching so that it will pass through the restricted portion of the opening 16 and when tension is released the rivet assumes its normal cross sectional shape filling the opening and holding the backing and facing layers together as an integral unit. It will be noted that in both embodiments of the invention the rivet is distorted out of its normal shape and its cross sectional area is reduced sufficiently to permit passage of the rivet through the backing layer. Upon return to its normal shape the rivet engages the backing layer, or the washer 11 in the embodiment of Figure 1, to resiliently hold the layers together.

My invention provides a laminated press pad in which the layers are secured to one another by fasteners which are resilient to approximately the same degree as the facing layer so that when compressive forces are applied to the facing layer, the fastening means are capable of flowing in substantially the same manner as the facing layer and thus do not detract from the advantages residing in the use of a resilient, flowable facing. By the use of my pad, any wrinkling or other distortion which might result if there was a great differential in the resilient characteristics of the facing and fastening means is avoided. In addition, the rivets securely hold the facing layer and backing layer as a unit during use insuring that the facing layer will be in proper position with respect to the die at all times. The arrangement is such that the facing layer may move laterally to a slight degree with respect to the backing layer, thus permitting the desired flow of the facing in use.

While I have described and illustrated certain preferred embodiments of my invention, it will be understood that the invention is not limited to such embodiments for it may be otherwise embodied within the scope of the following claims.

I claim:

1. As a new article of manufacture, a press pad for use in the shaping and/or shearing of sheet material over a die which comprises a facing layer of resilient rubber, a backing layer disposed in contiguous relationship to the facing layer, and resilient rubber fastening means having substantially the same flow characteristics as the facing layer passing through said layers to join said layers together.

2. As a new article of manufacture, a press pad for use in the shaping and/or shearing of sheet material over a die which comprises a resilient rubber facing layer, a backing layer of compressible cork composition disposed in contiguous planar relationship to said facing layer, and resilient rubber rivets having substantially the same flow characteristics as the facing layer extending through said layers joining the layers together to form an integral unit.

3. As a new article of manufacture, a press pad for use in the shaping and/or shearing of sheet metal over a die which comprises a resilient rubber facing layer, a backing layer of compressible cork composition disposed in contiguous planar relationship to said facing layer, and resilient rubber rivets having substantially the same flow characteristics as the facing layer extending through said layers to secure them together to form an integral unit, each of said rivets including a tapered head, and a shank extending therefrom through said backing layer, said shank terminating in an enlarged end disposed at the rear of the backing layer.

4. As a new article of manufacture, a press pad for use in the shaping and/or shearing of sheet metal over a die which comprises a resilient rubber facing layer having openings formed therein, a backing layer of compressible cork composition disposed in contiguous planar relationship to said facing layer having openings therein in alignment with the openings in said facing layer, and resilient rubber rivets having substantially the same flow characteristics as the facing layer disposed in said openings to secure said layers together as an integral unit, each of said rivets including an enlarged head disposed in an opening in said facing layer, a shank extending therefrom through an opening in said backing layer, said shank terminating in an enlarged end of greater diameter than the opening through which the shank extends, and a resilient washer surrounding said shank and disposed between the enlarged end and the rear surface of said backing layer adapted to prevent withdrawal of the rivet from said opening.

5. As a new article of manufacture, a press pad for use in the shaping and/or shearing of sheet material over a die which comprises a facing layer of resilient material, having a Durometer hardness within the range of 65 to 70, a backing layer disposed in contiguous relationship to the facing layer, and resilient fastening means having substantially the same flow characteristics as the facing layer passing through said layers to join said layers together.

6. As a new article of manufacture, a press pad for use in the shaping/or shearing of sheet metal over a die which comprises a rubber facing layer having tapered openings formed therein and having a Durometer hardness within the range of 65 to 70, a compressible backing layer of cork composition having openings therein in alignment with the openings in said facing layer, said layers being disposed in contiguous, planar relationship, rubber members of approximately the same hardness as the facing layer retaining said layers as an integral unit, each member including a tapered head fitted in an opening in said facing layer, a shank extending therefrom through the opening in said backing layer and terminating in an enlarged end of greater diameter than the shank, a resilient washer surrounding said shank and held between the enlarged end and the rear surface of said backing layer, a coating of rubber cement disposed over the tapered heads of said members, and a second backing layer of compressible cork composition contiguous with said first layer and having shaped recesses therein adapted to accommodate the enlarged ends and said washers.

JOHN L. BERGER.

---

CERTIFICATE OF CORRECTION.

Patent No. 2,369,643.     February 20, 1945.

JOHN L. BERGER.

It is hereby certified that error appears in the printed specification of the above numbered patent requiring correction as follows: Page 3, second column, line 15, claim 6, for "shaping/or" read --shaping and/or--; and that the said Letters Patent should be read with this correction therein that the same may conform to the record of the case in the Patent Office.

Signed and sealed this 5th day of June, A. D. 1945.

Leslie Frazer (Seal)     Acting Commissioner of Patents.

compressible cork composition disposed in contiguous planar relationship to said facing layer, and resilient rubber rivets having substantially the same flow characteristics as the facing layer extending through said layers joining the layers together to form an integral unit.

3. As a new article of manufacture, a press pad for use in the shaping and/or shearing of sheet metal over a die which comprises a resilient rubber facing layer, a backing layer of compressible cork composition disposed in contiguous planar relationship to said facing layer, and resilient rubber rivets having substantially the same flow characteristics as the facing layer extending through said layers to secure them together to form an integral unit, each of said rivets including a tapered head, and a shank extending therefrom through said backing layer, said shank terminating in an enlarged end disposed at the rear of the backing layer.

4. As a new article of manufacture, a press pad for use in the shaping and/or shearing of sheet metal over a die which comprises a resilient rubber facing layer having openings formed therein, a backing layer of compressible cork composition disposed in contiguous planar relationship to said facing layer having openings therein in alignment with the openings in said facing layer, and resilient rubber rivets having substantially the same flow characteristics as the facing layer disposed in said openings to secure said layers together as an integral unit, each of said rivets including an enlarged head disposed in an opening in said facing layer, a shank extending therefrom through an opening in said backing layer, said shank terminating in an enlarged end of greater diameter than the opening through which the shank extends, and a resilient washer surrounding said shank and disposed between the enlarged end and the rear surface of said backing layer adapted to prevent withdrawal of the rivet from said opening.

5. As a new article of manufacture, a press pad for use in the shaping and/or shearing of sheet material over a die which comprises a facing layer of resilient material, having a Durometer hardness within the range of 65 to 70, a backing layer disposed in contiguous relationship to the facing layer, and resilient fastening means having substantially the same flow characteristics as the facing layer passing through said layers to join said layers together.

6. As a new article of manufacture, a press pad for use in the shaping/or shearing of sheet metal over a die which comprises a rubber facing layer having tapered openings formed therein and having a Durometer hardness within the range of 65 to 70, a compressible backing layer of cork composition having openings therein in alignment with the openings in said facing layer, said layers being disposed in contiguous, planar relationship, rubber members of approximately the same hardness as the facing layer retaining said layers as an integral unit, each member including a tapered head fitted in an opening in said facing layer, a shank extending therefrom through the opening in said backing layer and terminating in an enlarged end of greater diameter than the shank, a resilient washer surrounding said shank and held between the enlarged end and the rear surface of said backing layer, a coating of rubber cement disposed over the tapered heads of said members, and a second backing layer of compressible cork composition contiguous with said first layer and having shaped recesses therein adapted to accommodate the enlarged ends and said washers.

JOHN L. BERGER.

---

CERTIFICATE OF CORRECTION.

Patent No. 2,369,643. February 20, 1945.

JOHN L. BERGER.

It is hereby certified that error appears in the printed specification of the above numbered patent requiring correction as follows: Page 3, second column, line 15, claim 6, for "shaping/or" read --shaping and/or--; and that the said Letters Patent should be read with this correction therein that the same may conform to the record of the case in the Patent Office.

Signed and sealed this 5th day of June, A. D. 1945.

Leslie Frazer (Seal) Acting Commissioner of Patents.